Jan. 26, 1954
R. M. ROOD ET AL
2,667,606
CAPACITOR AND TERMINAL LEAD THEREFOR
Filed Dec. 8, 1951
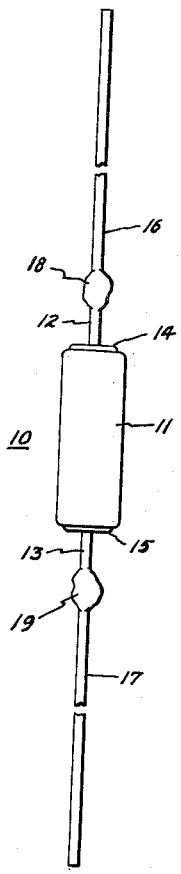
Inventors:
Robert M. Rood,
Otto A. Keser,
by Ernest H. Britton
Their Attorney.

Patented Jan. 26, 1954

2,667,606

UNITED STATES PATENT OFFICE 2,667,606

CAPACITOR AND TERMINAL LEAD THEREFOR

Robert M. Rood, Pittsfield, Mass., and Otto A. Keser, Aldan, Pa., assignors to General Electric Company, a corporation of New York Application December 8, 1951, Serial No. 260,688

1 Claim. (Cl. 317—230)

This invention relates to capacitors and electric terminal leads therefor. More particularly the invention relates to leads for capacitors in connection with which tantalum metal is employed for the electrodes or foil.

In the case of electrolytic type capacitors, especially, it is essential that the portion of the terminal leads which is inside the capacitor case and in contact with the electrolyte be of the same material as the foil or electrodes therein, in order to maintain low leakage current characteristics. Consequently, when the foils or electrodes are of tantalum metal, it is necessary to use lead wires of tantalum metal welded internally to the tantalum electrodes and extending exteriorally out of the capacitor casing. Otherwise, however, leads of tantalum metal have presented a problem in that such leads oxidize and are very difficult to attach, even when the oxide is removed, to solder lug terminals of the apparatus in connection with which the capacitor is employed in service. Attempts have been undertaken to solve this problem by electrolytically copper plating the tantalum leads and then solder coating the copper plating, but such attempts have failed since the plating would strip off the leads when they were bent around the solder lug to anchor them mechanically. Mechanical crimping or interlocking of a tantalum lead to a lead of solderable metal has also been tried, but this type of joint has been found to cause noise in electronic circuits and is therefore not acceptable. Nevertheless, in view of the many advantages of capacitors having tantalum foil or electrodes, their continued use for many applications is extremely desirable, provided this troublesome lead problem can be solved.

It is therefore an object of this invention to provide a capacitor having electrodes or foils of tantalum metal and having leads which can be readily soldered to terminal lugs.

It is also an object of the invention to provide a capacitor having leads of solderable metal joined without loss of ductility by a welded joint to a lead of tantalum metal extending a relatively short distance exteriorally from the capacitor enclosure.

The invention will be better understood from the following description taken in connection with the accompanying drawing and its scope will be pointed out in the appended claim.

Referring now to the single figure of the accompanying drawing, we have shown, aside from the terminals or leads illustrated, an exterior view of a conventional electrolytic type capacitor 10, comprising an enclosing casing or container 11, which may be of metal and which contains a suitable electrolyte and a pair of electrodes of tantalum metal separated by a dielectric spacer and wound into a roll. Leads or terminals 12 and 13 of tantalum metal are respectively connected electrically, as by welding, to the electrodes, and project a relatively short distance exteriorally beyond opposite ends of the casing 11, as illustrated. Leads 12 and 13 are insulated from the capacitor case 11 by suitable bushings 14 and 15 respectively, which may be of resilient material such as natural or synthetic rubber, and also serve to seal off the interior of the case from the atmosphere. As thus far described, the capacitor is conventional, as previously indicated, except that the exteriorally projecting portions of the leads 12 and 13 are much shorter than is necessary to facilitate attachment to the terminals of apparatus to which the capacitor may be connected. However, in accordance with our invention, we provide leads of sufficient length by connecting relatively long leads of solderable metal 16 and 17 to the tantalum leads 12 and 13 by satisfactorily welded joints 18 and 19 respectively, notwithstanding the prior difficulty of making such a joint because of the tendency of the solderable wire to vaporize and the possible defects of such a joint which might be caused by embrittlement of the wire adjacent thereto. Solderable leads of tin-plated copper wire, copper-clad iron, nickel wire, copper wire and alloys of these metals which are readily solderable with common flux and solder composition are representative of a few of the solderable leads thus far successfully joined by applicants to tantalum lead wires.

We have devised several ways of making these joints. For example, we have wrapped a portion of the tantalum lead extending from an end of a capacitor case in a coil around a similar size tinned copper wire in such a manner that the inner end of the copper wire extends a short distance above the tantalum coil spiral. We then clamp or otherwise fix the capacitor in a fixture which serves as one electrode of the welding circuit, with both the tantalum wire and copper wire making electrical contact with the fixture. The other electrode which may be of tungsten or carbon, and is mounted on a pivoted arm, is next brought into contact or permitted to rest lightly on the end of the extending copper-clad wire. The joint is then blanketed with an inert gas, such as argon, and current is permitted to flow from the tungsten or carbon electrode through the wire into the fixture, to complete the circuit, whereupon an arc is established between the carbon or tungsten electrode and the wire due to melting of the portion of copper wire extending out of the tantalum wire coil. The clamping fixture apparently acts as a chill block and instead of the complete melting away or vaporization of the small wire parts, the copper wire and tantalum wire bond together into a welded joint which is neither embrittled nor weak. Moreover, both the tantalum and the copper wire adjacent to the joint were found to have good ductility, which of course is essential to stand the bending which occurs during assembly of the capacitor to electrical apparatus. In the case of solderable leads of nickel and copper-clad iron wire, which do not become weakened to any severe degree, the tantalum wire need not be wrapped in a coil around the solderable wire which is merely bent into an L-shape, with the short leg of the L projecting upwardly for engagement of the end thereof with the tungsten or carbon electrode and the turn between the short and long legs of the solderable wire closely adjacent the end of the tantalum wire extending from the capacitor case. Upon the application of current, the short leg of nickel or copper-clad iron wire fuses onto and with the tantalum wire to form a more or less butt-welded joint, as distinguished from the lap joint formed by coiling tantalum wire around the solderable wire.

Since the tantalum wire adjacent this joint was not as strong as desired, we currently make the joint by first melting the tantalum wire down upon itself in a fixture, so that a ball of tantalum will form at the end of the wire, which remains strong and relatively ductile at the point of entry into the ball. Then the solderable wire is bent into an L shape, as before, with the turn between the short and long legs thereof placed adjacent or in close proximity to the ball. Then an arc is struck to the end of the solderable wire which causes melting of the wire into a cavity in the holding fixture which contains the ball at the end of the tantalum wire. When this molten material strikes the ball of tantalum in the cavity, it fuses to it, without melting the entire ball of tantalum. This leaves the tantalum wire as strong and ductile where it leaves the joint as the tantalum was when the ball was formed on the end of the wire.

In practice, the lead or terminal wires range from .010 to .052 inch in diameter and the distance from the welded joint to the end of the capacitor ranges from ⅛ to ½ inch. An advantage of this relatively short tantalum lead length prior to welding onto the solderable metal lead is that the leads do not become twisted together and bent out of shape as readily as long leads during manufacture. As a result, a smaller percentage of damage to the capacitor occurs in manufacture and a more reliable product is produced.

While we have, in accordance with the patent statutes, shown and described a particular embodiment of our invention, it will be obvious that changes and modifications can be made without departing from the invention, in its broader aspects and we, therefore, aim in the appended claim to cover all such changes and modifications as fall within the true spirit and scope of the invention.

What we claim as new and desire to secure by Letters Patent of the United States is:

In an electrolytic capacitor comprising a tubular container of metal, a pair of electrodes of tantalum metal wound into a roll and disposed within said container, a pair of terminal wires of tantalum metal respectively connected electrically to said electrodes and projecting exteriorally and respectively at the ends thereof from the opposite ends of said container, said terminal wires respectively extending through a pair of bushings of resilient insulating material positioned at said opposite ends of said container and sealing the interior thereof from the atmosphere, and a pair of leads of solderable metal electrically connected respectively to said tantalum terminal wires by welded joints, said joints being respectively positioned from said bushings a distance ranging from ⅛ to ½ inch, each of said welded joints comprising a ball of tantalum integral with said projecting wire ends, said leads fused to said balls, said wires and leads extending from said balls in substantially opposite directions, and the diameter of said balls being substantially greater than the diameter of said wires and leads.

ROBERT M. ROOD.
OTTO A. KESER.

References Cited in the file of this patent

UNITED STATES PATENTS

| Number | Name | Date |
|---|---|---|
| 1,935,860 | Robinson | Nov. 21, 1933 |
| 2,355,788 | Dunleavey | Aug. 15, 1944 |
| 2,375,211 | Brennan | May 8, 1945 |

OTHER REFERENCES

Electrical Manufacturing, December 1950, Miniaturizing the Tantalum Capacitor.